United States Patent

Freedman

[15] 3,699,960
[45] Oct. 24, 1972

[54] PARABIOTIC DIALYSIS APPARATUS

[72] Inventor: Frank B. Freedman, 3430 Boone Avenue S., Minneapolis, Minn. 55426

[22] Filed: Jan. 4, 1971

[21] Appl. No.: 103,774

[52] U.S. Cl. ...........128/214 B, 128/DIG. 3, 210/321
[51] Int. Cl. .....................A61m 01/03, A61m 05/00
[58] Field of Search......................128/214 R, 214 B, 210/321

[56] References Cited

UNITED STATES PATENTS

| 3,212,498 | 10/1965 | McKirdy................210/321 X |
| 3,212,642 | 10/1965 | Kylstra......................210/321 |
| 3,332,746 | 7/1967 | Claff et al. .............210/321 X |

FOREIGN PATENTS OR APPLICATIONS 1,198,032  7/1970  Great Britain.............210/321

OTHER PUBLICATIONS

Pavone–Macaluso et al., Lancet– October 1959, pp. 704– 707.
Pavone–Macaluso et al., Trans. Amer. Soc. Artif. Inter. Organs– 1964 (Vol. X) pp. 285– 291, 296– 297.

*Primary Examiner*—Dalton L. Truluck
*Attorney*—Wicks and Nemer

[57] ABSTRACT

Parabiotic dialysis apparatus which may be safely used with humans is disclosed. Three chambers are fluidically interconnected yet separated by two membranes to enable safe and efficient transfer of substances between the blood of two organisms. One chamber is arranged to be connected into the blood circulation system of a normal human. A second chamber is arranged to be connected into the blood circulation system of a diseased human. A third chamber, which is split into two interconnected halves, is arranged to hold physiological fluid. The chambers are arranged with the third chamber between the first and second chambers. The membranes are arranged with one membrane forming the fluid boundary between the first chamber and one half of the third chamber and the second membrane forming the fluid boundary between the second chamber and the other half of the third chamber to thus provide a fluid path from the first chamber to the second chamber which fluid path can transfer substances to and from the first and second chambers across the membranes and third chamber due to convection and diffusion.

11 Claims, 3 Drawing Figures

PATENTED OCT 24 1972

3,699,960

INVENTOR.
Frank B. Freedman
BY
Wicks & Nemer
ATTORNEYS

PARABIOTIC DIALYSIS APPARATUS

BACKGROUND

The present invention relates generally to dialysis of organisms and more specifically to parabiotic dialysis, i.e. dialysis of one organism against another organism.

Dialysis is a well-known technique involving the transfer of substances by diffusion across a membrane separating tow solutions. When applied in treating patients having kidney disease, the conventional hemodialysis process (artificial kidney) is maintained by the convective properties of the two fluids involved. Blood brings waste materials to one side of a membrane whereupon transfer through the membrane occurs due to the physical diffusion forces. Waste material is swept away from the opposite side of the membrane by the convective properties of the moving dialysate fluid.

Conventional hemodialysis, however, requires large quantities of physiological solution which form the dialysate. Also, complex operating equipment is required to: form the dialysate, starting from a concentrated salt solution; prepare water suitable for dialysis; monitor the dialysate conductivity; monitor gross membrane failures; monitor and control temperature; and, provide a vacuum enabling water loss due to ultrafiltration.

Parabiotic dialysis apparatus also provides the means for treatment of diseases, specifically liver and kidney failure.

When utilized for kidney failure, parabiotic dialysis apparatus affords significant economical improvement in terms of both capital equipment, operating costs, and complexities and significant physiological improvement compared to conventional hemodialysis. In contrast to conventional hemodialysis which provides transfer of substances by an open-loop process, application of parabiotic dialysis provides a well-controlled, closed-loop transfer of substances due to the availability and operation of the many physiological controlling mechanisms operating in the normal human. For example, the many hormonal and nervous regulating mechanisms operating in the normal organism control the various blood component levels. Since these levels constitute an important component of the driving forces controlling the exchange of substance across a dialyzer, such exchange is well-controlled. The possibilities of too much or too little exchange for each of the blood components involved is greatly reduced during application of parabiotic rather than conventional hemodialysis. Also in addition, undesirable loss of substances, such as amino acids, divalent ions, vitamins, and the like, is minimized when parabiotic dialysis is applied since substantially equal concentrations exist in both humans and thus no driving forces exist causing their diffusive exchange.

All previous known parabiotic apparatus is inappropriate for or incapable of providing ultrafiltration (water removal).

SUMMARY

The present invention solves this and other problems of prior devices employed formerly by providing parabiotic dialysis apparatus capable of efficient ultrafiltration.

Briefly, a preferred embodiment of the present invention as applied to treatment of kidney failure is composed of a first chamber which is arranged to be connected into the blood circulation of a diseased human, a second chamber which is similarly arranged to be connected into the blood circulation of a normal human or animal, and a third chamber is arranged to hold physiological fluid. The third chamber is divided into two fluidically connected portions. The chambers are arranged with the third chamber between the first and second chambers, and the membranes are arranged with one membrane forming the fluid boundary between the first chamber and one portion of the third chamber and the second membrane forming the fluid boundary between the second chamber and the other portion of the third chamber to thus provide a fluid path from the first chamber to the second chamber which fluid path can transfer substances to and from the first and second chambers across the membranes and third chamber due to convection and diffusion.

In the preferred embodiment, each chamber is a thin, hollow parallelepiped, with one side of each of the first and second chambers arranged to receive a membrane. When both portions of the third chamber are filled with physiological fluid, interconnected, and interposed between the other two chambers, waste material from the blood of the diseased human can diffuse across the membrane supported between the first chamber and one portion of the third chamber, circulate throughout the entire third chamber and to the second portion, diffuse across a membrane supported between the second chamber and the second portion of the third chamber, and transfer into the blood of the normal human where the waste material may be removed by normal excretory bodily processes. In a similar manner, blood substances present in the normal human at normal physiological levels but low in the diseased human can transfer from the normal to the diseased human in an analogous but reversed fashion, the sequence of events initiating in the blood of the normal human. Such substances supplied to the diseased human in this manner may then be utilized for its metabolic functions.

It is thus an object of the present invention to provide safe and efficient parabiotic dialysis apparatus providing ultrafiltration.

It is a further object of the present invention to provide safe and efficient parabiotic dialysis apparatus which is relatively simple and inexpensive to manufacture.

These and further objects and advantages of the present invention will become clearer in the light of the following detailed description of an illustrative embodiment of the present invention described in connection with the drawings.

Figure 1:
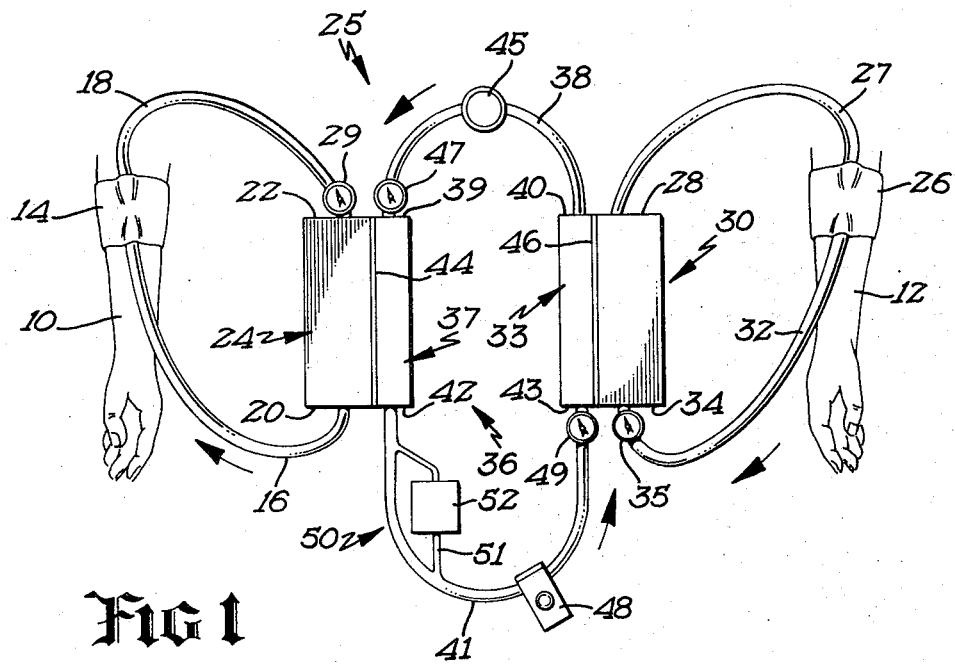
FIG. 1 shows a schematic representation of the improved parabiotic dialysis apparatus of the present invention in relation to a diseased human and a normal human, both represented by forearm portions of their bodies.

Where used in the various figures of the drawings, the same numerals designate the same or similar parts. When the terms "top," "bottom," "right," "left," "front," "back," "vertical," and "horizontal" are used herein, it should be understood that these terms have reference only to the structure shown in the drawings as it would appear to a person viewing the drawings and are utilized only to facilitate describing the invention.

DESCRIPTION

In FIG. 1, a diseased organism 10 and a normal organism 12, both preferrably humans, are represented by forearm portions of their bodies. Thus at the onset, it should be noted that while the present invention is useful for any mammalian organism, it is primarily intended for human use, and for the purpose of description, it will hereafter be described in relation to its use with human beings. Also, for the purposes of this invention, a diseased human is defined as one having an abnormal deficiency or excess of at least one physiological substance while a normal or healthy human is defined as one not having such a deficiency or not retaining such an excess of that substance. Either may be diseased or healthy in other regards and, as will become clear, it may not affect the definition of diseased or healthy as used with respect to the present invention.

A cannulation site 14 is shown connected to the forearm of the diseased human 10 in a conventional fashion, i.e., a connection is made between a vein in the diseased human 10 and a first cannula tube 16, and a connection is made between an artery in the diseased human 10 and a second cannula tube 18. Various types of cannula devices are well known to those skilled in the art, and no further description thereof is included. Further, those skilled in the art are familiar with the tubing types which may be used for tubes 18 and 18, such as medical grade silicon rubber tubing made by Dow Corning and a further description thereof is not included.

A conventional shunt, not shown, may be used with cannula site 14 to shunt blood from tube 16 and tube 18 until the system is ready for operation. Tubes 16 and 18 are further arranged to connect to the opposite faces 20 and 22, respectively, of a first chamber 24 which is a part of the three chamber parabiotic dialysis apparatus of the present invention, generally designated 25. Thus, when the cannula shunt is removed tubes 16 and 18 provide fluid communication between the diseased human 10 and chamber 24. That is, blood is pumped by a mechanical cardiovascular pump 29, not shown, or by the heart of the diseased patient and flows from the diseased human 10 from the artery in the forearm, through tube 18 and into chamber 24, through chamber 24, out of chamber 24 and through tube 16, back to the forearm vein of human 10, and back to the circulation system of the diseased human 10. Similarily, blood is conducted from the artery in the forearm of the normal human 12, through cannulation site 26, to cannula tube 32 connected to a face 34 of a second chamber 30 within the apparatus 25 of the present invention, through chamber 30, out of chamber 30 through tube 27 connected to a face 28 of chamber 30 opposite face 34, and back to a forearm vein in the normal human 12 through cannula tube 27.

Conventional pressure gauges 29, and 35 are also employed, gauge 29 in the flow of blood through tube 18 adjacent face 22 of chamber 24 and gauge 35 in the flow of blood through tube 32 adjacent face 34 of chamber 30.

A third chamber 36 is interposed between chambers 24 and 30 in a manner hereinafter described. Chamber 36 is formed of two chambers, 33 and 37, each of which forms a portion of chamber 36, in the prefered embodiment shown, one-half. A tube 38 interconnects similarly oriented end faces 39 and 40 on first ends of halves 33 and 37, and a tube 41 interconnects similarly oriented end faces 42 and 43 on the opposite ends of halves 33 and 37. A physiological solution is caused to circulate within half chambers 33 and 37 of chamber 36 through tubes 38 and 41. For the purposes of this invention, physiological solution is defined as a fluid which is entirely compatible with the body, such as 6 percent dextran in saline, or a fluid which can be tolerated in small amounts such as soy bean oil, flurocarbons, and silicon fluids. Conventional pressure gauges 47 and 49 are employed to monitor the pressure of the physiological fluid flowing through tubes 38 and 41, with gauge 47 positioned adjacent face 39 of chamber 37 and gauge 49 positioned adjacent face 43 of chamber 33. Further, a variable orifice or a variable restriction 45 is inserted in the fluid path provided by tube 38 to perform as a fluid resistance, for the purposes hereafter explained. Such variable orifices are well known to those skilled in the art and are readily available from commercial sources such as Curtin Manufacturing Company.

With the circulation of the physiological fluid within chamber 36 and the circulation of blood within chambers 24 and 30, waste materials in the blood of the diseased human 10, for example, may transfer by convection to chamber 24, and diffuse through a membrane 44 held between chamber 24 and half 37 of chamber 36 into the recirculating physiological fluid within chamber 36, transfer by convection across chamber 36 to a membrane 46 held between half 33 of chamber 36 and chamber 30, diffuse through membrane 46, and thus enter the blood of human 12 flowing within chamber 30. The waste material may be then removed from the blood of the normal human by the normal bodily excretory or metabolic processes.

A conventional pump 48 is shown adjacent tube 41 which maintains the circulation within chamber 36. Variable speed pumps of this type are well known to those skilled in the art and pumps of the vibrating type such as the "Vibrostatic" pump manufactured by the Chemical Rubber Company of Cleveland, Ohio may be used.

In the case of membrane failure, blood components from either organism 10 or 12 may flow from either chamber 24 or 30 into chamber 36 and appear in the physiological solution within chamber 36. Notice, however, that blood from the diseased human 10 and the normal human 12 will not commingle upon the failure of a single membrane. To further guarantee that blood from humans 10 and 12 will not commingle, a membrane failure detector, generally designated 50, is arranged to continuously sample the physiological solution in chamber 36 due to the presence of shunt tube 51 which intersects tube 41 to conduct a portion of the physiological fluid flowing through tube 41 through the membrane failure detector 50, through a thin window Geiger counter designated 52 having a flow through cell, and back to tube 41. Such Geiger counters are available from Wm. B. Johnson and Associates of Montville, New Jersey such as model GSM–5 Survey meter.

The preferred embodiment of the membrane leak detector 50 utilizes a radioisotope tracer molecule added to the physiological fluid in chamber 36. Therefore, if diffusion of the tracer molecule occurs due to a membrane leak, the concentration of the tracer molecule in chamber 36 is reduced, and radiation detector 52, within blood leak detector 50, detects the decreased radioactivity of the physiological fluid flowing through tube 51, as shunted from tube 41, to allow the sounding of an alarm.

Figure 2:
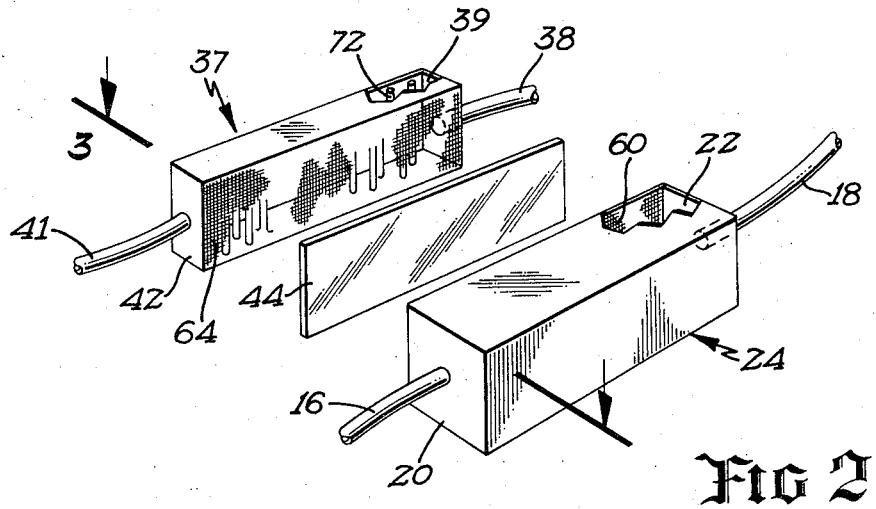
FIG. 2 shows an exploded perspective of a part of the improved parabiotic dialysis apparatus of the present invention.
Figure 3:
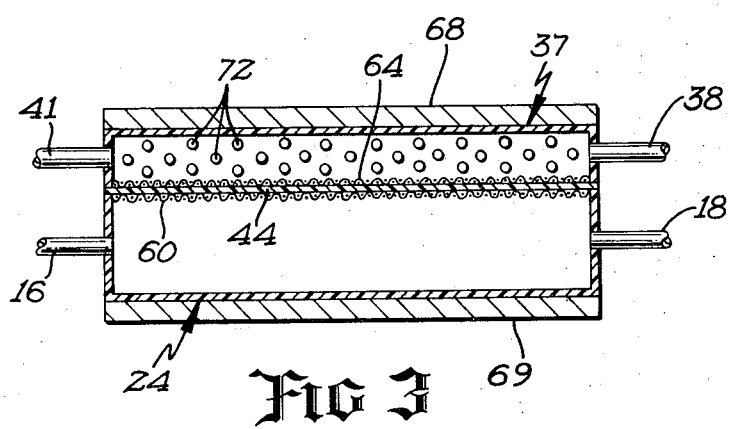
FIG. 3 shows a section of the improved parabiotic dialysis apparatus of the present invention taken along section lines 3—3 in FIG. 2.

FIGS. 2 and 3 show more detailed views of parts of parabiotic dialysis apparatus 25 of FIG. 1. From these figures it may be seen that first closed surface forms the chamber 24 which is designed to hold blood from the diseased human 10. Chamber 24 is shown in the preferred embodiment as a rectangular parallelepiped having end faces 20 and 22 arranged to receive tubes 16 and 18, respectively, for providing fluid communication between chamber 24 and the diseased human 10.

A side face 60 connecting end faces 20 and 22 of the rectangular parallelepiped forming chamber 24 is of a screening material to provide support for membrane 44 in the assembled parabiotic apparatus 25. Since the mesh size of screen 60 is much larger than the pore size of membrane 44, screen 60 will support membrane 44 without significantly interfering with the material transfer across membrane 44.

Chamber 24 is arranged to provide an internal volume, including the volume contained within tubes 16 and 18, of between 50 and 500 cubic centimeters. Good results can be obtained using a volume of 300 cubic centimeters. If chamber 24 is of insufficient volume, blood flow will be impeded, and, the overall transfer of waste materials will be greatly reduced. If the volume of chamber 24 is too large, an excess amount of blood will be required from the diseased human, and various well known undesirable effects may result.

Similarly, a second closed surface forms the chamber 30 which is designed to hold the blood of the normal human 12. Chamber 30 is shown, in the preferred embodiment, in the form of a rectangular parallelepiped having end faces 28 and 34 arranged to receive cannula tubes 27 and 32, respectively, for providing fluid communication between chamber 30 and the normal human 12.

A side face 62 of the rectangular parallelepiped forming chamber 30, adjacent side face 60 of chamber 24, is also of a screening material to provide support for membrane 46 in the assembled parabiotic apparatus 25 similarly to the manner in which screen 60 provides support for membrane 44.

Chamber 30 is arranged to provide an internal volume including the volume contained within tubes 27 and 32, of between 50 and 500 cubic centimeters. Good results can be obtained using a volume of 300 cubic centimeters. The upper and lower volume limits are gain governed by the considerations given above with respect to chamber 24.

Chamber 36 is formed of two closed surfaces, each defining one of chamber 33 or 37. Chambers 33 and 37 are each designed to hold the physiological solution forming the interface between the blood of the diseased human 10 and the blood of the normal human 12. Thus, the chambers 37 and 33 which together form chamber 36 are shown in the preferred embodiment figures in the form of rectangular parallelepipeds with chamber 37 having end faces 39 and 42 receiving tubes 38 and 41 respectively and chamber 33 having end faces 40 and 43 again receiving tubes 38 and 41 for providing a fluid path allowing the physiological solution within the portions 37 and 33 of chamber 36 to recycle. A first side face 64 of the rectangular parallelepiped forming half 37 of chamber 36 is arranged to lie adjacent side face 60 of chamber 24 and is further formed of a like screen material to provide additional support for membrane 44 in the assembled condition of parabiotic apparatus 25 between screen face 60 of chamber 24 and screen face 64 of chamber 36. Similarly a second side face 66 of the rectangular parallelepiped forming half 33 of chamber 36 is arranged adjacent screen face 62 of chamber 30 and is further of a like screen material to thus support membrane 46 between screen face 66 of chamber 36 and screen face 62 of chamber 30 in the assembled condition of parabiotic apparatus 25.

Bilateral support for membranes 44 and 46 is not always necessary and depends upon the particular application of parabiotic dialysis apparatus 25 of the present invention. For example, in the preferred application to kidney disease, screen faces 60 and 66 are not necessary since the fluid flow rates and hence fluid pressures in chambers 24, 37, 33, and 30 is arranged to increase from chamber 24 to chamber 30 by the placement of variable orifice 45 and by the speed of pump 48, and hence the pressure on membranes 44 and 46 is arranged to be in a direction from chamber 24 towards chamber 30. Thus, screen faces 62 and 64 may adequately support membranes 46 and 44, respectively, while preventing gross bulging of the membranes.

Chamber 36 has been found to operate properly with volumes from 200 to 2000 cubic centimeters, which includes the volume contained within tubes 38, 41 and 51. Good results can be obtained using a 1,000 cubic centimeter volume. If the volume of chamber 36 is too large, excessively large volumes of physiological solution are required, and an excessive quantity of radioisotope tracer is required. On the other hand, if the volume of chamber 36 is insufficient fluid flow throughout chamber 36 is impeded, resulting in decreased fluid mixing and and attendant efficiency decrease in parabiotic dialysis apparatus 25.

The areas of both membranes 44 and 46 range between 0.2 and 3.0 square meters each. Good results can be obtained using a surface area of 1.0 square meters for each of membranes 44 and 46. Increasing membrane areas require increased chamber volumes, the consequences of which have been previously discussed. A smaller membrane area reduces the area available for transfer of blood components, thereby decreasing the efficiency of the parabiotic dialysis.

It will be realized by those skilled in the art that the inside surfaces of chambers 24 and 30 must present a surface compatible with blood, as must all surfaces of the present invention coming into contact with blood.

That is, these surfaces must be inert and non-reactive to body tissue and not significantly change in permeability throughout the period of parabiotic dialysis. Screening which is in contact with blood can be either coated with Dow Corning Silastic Rubber or can be fabricated from existing collagen fibers. Cellophane and cuprophane membranes are also well known to those skilled in the art and meet this criteria.

When applied to the treatment of kidney failure, a preferred embodiment of membranes 44 and 46 have a molecular weight cut-off of approximately 5,000-10,000, i.e. beyond the 5,000-10,000 molecular weight, transfer through the membrane is impeded or blocked. Examples of such membranes are collagen membranes available from the Japanese Leather Company through Dr. Rubin at Columbia University, or cellophane or cuprophane membranes unilaterally stretched and/or acetylated according to the technique of Craig. Further, commercially available cellophane and cuprophane membranes which are utilized by existing hemodialyzers may be used when unilaterally stretched and/or acetylated according to the technique of Craig. Collagen membranes possess the appropriate pore sizes to allow passage of bodily waste and yet restrict passage of blood protein.

Many known physiological solutions may be used to fill chamber 36. One such physiological solution is "Dextran 70" (6 percent Dextran in normal saline) as manufactured by Cutter Laboratories.

The assembled condition of one part of parabiotic dialysis apparatus 25 of the present invention is shown in FIG. 3 where two supporting plates 68 and 69 are arranged along the outside faces of chamber 24 and half 37 of chamber 36. By drawing support plates 68 and 69 together and securing them by conventional means, not shown, chamber 24 and half 37 of chamber 36 are drawn into fluidic contact to form a part of parabiotic apparatus 25. Also support plates 70 and 71, not shown, are secured together to draw chamber 30 and half 33 of chamber 36 into fluidic contact to form a similarly configured additional part of parabiotic apparatus 25.

In particular, in the assembled condition of parabiotic dialysis apparatus 25, a first face of membrane 44 is arranged to directly contact the blood within chamber 24 and a second face of membrane 44 is arranged to contact the physiological solution in half 37 of chamber 36. Thus, the membrane 44 forms an interface between chamber 24 and half 37 of chamber 36.

Further, a first face of membrane 46 is arranged to contact the physiological solution of half 33 of chamber 36 and a second face of membrane 46 is arranged to contact blood within chamber 30. Thus, the membrane 46 forms an interface between chamber 36 and half 33 of chamber 30.

Appropriate gasketing material should be placed along the outer periphery of the membranes on both sides to assure the maintenance of a proper seal and the avoidance of system leaks. Appropriate gasket material that is compatible with body tissues is well known to those skilled in the art.

As best shown in FIG. 3, a plurality of projections 72 are arranged throughout chamber 36 between the top and bottom faces thereof with their axes substantially parallel to the planes of faces 64 and 66 of this chamber. Projections 72 are arranged to cause a turbulence within chamber 36 to obtain good mixing of the physiological fluid to provide a representative sample of the physiological fluid for the membrane failure detector 50 and minimize boundary layers in chamber 36. Projections 72 thus enhance the transfer of material across chamber 36 by insuring a nearly uniform concentration within this chamber.

As indicated, mechanical cardiovascular blood pumps or the heart of each human, not shown, maintain the circulation of blood within the respective chambers to which they are attached. Further, pump 48 maintains the recirculation of physiological solution within chamber 36. Fluid flow on both sides of membrane 44 and 46 determine the transmembrane pressures that exist during operation of the parabiotic dialysis apparatus. For application to kidney deficiency, as discussed earlier, it is desirable to maintain the membrane size of individual pores such that passage of substances of molecular weight greater than 5,000 to 10,000 is impeded or blocked. The interrelationships of factors governing this restriction are Poison's ratio, membrane adiabatic bulk modulus, transmembrane pressure, screening material geometry and other physical properties well known to those skilled in the art of materials science. The flow of fluid on either side of membrane 44 or 46 may assume any direction relative to one another, however, good results can be obtained when the flow of blood in chamber 24 and physiological solution in chamber 36 is parallel or co-current.

OPERATION

The operation of the preferred embodiment of the present invention will be described with reference to the dialyzing of a human 10 with a kidney disease which prevents the excretion of certain waste materials against a human 12 having normal bodily excretory processes. Once the preferred embodiment of the parabiotic dialysis apparatus of the present invention is described for this use, its extension to other uses is within the normal skill in the art.

In general, the parabiotic dialysis apparatus 25 of the present invention operates by providing a fluidic path between the blood of a human 10 with a kidney disease and the blood of a normal human 12, while physically separating each blood supply, to allow the high concentration of waste material in the blood of the diseased human to diffuse into the blood of the normal human for removal by normal bodily excretory processes. The respective blood supplies are separated by two membranes which allow the transfer of waste substances and prevent the transfer of blood protein. That is, waste substances such as urea, creatinine, water, and potassium having molecular weights of 60, 113, 18 and 39, respectively, can pass from the blood of the diseased human, through the membranes, and into the blood of the normal human where these substances are removed from the blood by the normal excretory processes of the normal human. During this transfer, however, the molecular weight cutoff of the membranes of approximately 5,000 to 10,000 discussed hereinbefore prevents the undesirable passage of blood components ranging in molecular weight from 5,000 to 10,000 and upward.

Further, since the parabiotic dialysis apparatus 25 of the present invention includes a third chamber separating the chamber containing the blood of the diseased human 10 from the chamber containing the blood of the normal human 12 and two membranes, one positioned between each blood chamber and the third chamber, if a membrane failure occurs, membrane failure detection apparatus 50 is provided to sound an alarm and enable an operator or an automatic process to terminate the dialysis with sufficient time to avoid any transfer of undesirable blood components from one human to the other, with its possible deleterious effects, including death.

As a first step, physiological fluid (6 percent dextran in saline) is added to all four chambers 24, 30, 33, and 37, and their associated tubing. An anticoagulant, such as heparin, is injected into both humans before initiating parabiotic dialysis to retard the clotting of blood that occurs when blood comes in contact with foreign surfaces. Throughout the parabiotic dialysis, additional heparin is either added continuously at low levels or periodically.

A radioactive tracer is added directly into the middle chamber using a syringe and needle. In this application, Insulin–I131 having a molecular weight of approximately 5,700 is used as the radioisotope tracer. Insulin–I131 is available from Volk Radiochemical. Air bubbles are removed from tube 38, pump 48 is energized, and the recycling of fluid within the third chamber 36 is initiated. After allowing for complete mixing of the tracer with physiological fluid in chamber 36, the radioactivity of the fluid within third chamber 36 is measured by the Geiger counter 52. The membrane failure detection system 50 is then tested by replacing approximately 10 per cent of the fluid within the chamber 36 with nonradioactive physiological solution (6 per cent dextran in saline), and an alarm signal from membrane failure detection apparatus 50 should result, thereby indicating a proper functioning membrane failure detection system, as will be discussed in detail hereinafter. After resetting the alarm signal, which has now been adjusted to sense a 10 percent decrease of radioactivity from the given baseline value, all membranes are next examined for leaks by noting the radioactivity of the recycling fluid over the next 5 to 10 minute period, a constant value indicating the absence of membrane leaks.

The cannula shunt is removed from the normal human 12, cannula 27 and 32 inserted, and air bubbles are removed from tubes 27 and 32. The cannula shunt is then removed from the diseased human 10, cannula tubes 16 and 18 inserted, and air bubbles are removed from tubes 16 and 18. The flow rates in chambers 24 and 30 are adjusted gradually to the appropriate level, usually between 100–300 milliliters per minute by adjusting the speed of the two cardiovascular pumps.

The parabiotic dialysis run is thus begun, and will continue for the next 6 to 12 hours depending upon the waste levels within the diseased human, the operating parabiotic dialysis apparatus parameters chosen from the body weights and waste levels of the respective levels, as normally determined by the attending physician.

Recirculation flow rates of physiological solution within chamber 36 and blood within chambers 24 and 30 may also be varied to control the water loss from the diseased human 10 to the normal human 12 by ultrafiltration. Ultrafiltration will occur as long as the pressure of fluid throughout chamber 24 is greater than the pressure of fluid throughout chamber 37, and the pressure of fluid throughout chamber 33 is greater than the pressure of fluid throughout chamber 30. By controlling the speed of pump 48, the pressure of fluid throughout chamber 33 as read on pressure gauge 49 at face 43, may be adjusted to exceed the pressure of fluid throughout chamber 30, as read on gauge 35 at face 34, since the pressure throughout chamber 33 approaches the pump pressure. Next, variable orifice 45 is reduced in diameter, thus causing increased fluid resistance which decreases the pressure of fluid throughout chamber 37, as read on gauge 47 at face 39, and also increases the fluid pressure throughout chamber 33. Thus, the speed pump 48 may be reduced, and by successively manipulating the pump and the orifice opening, the correct pressures may be achieved.

The pressure difference thus created causes water to transfer from the blood of the diseased human within chamber 24, across membrane 44 to chamber 37, circulate to chamber 33, diffuse across membrane 46 into chamber 30 and into the blood of the normal human, where it may be removed by the normal bodily excretory processes of the normal human.

For the chamber volumes indicated herein of 300 cubic centimeters for chambers 24 and 30 and 1,000 cubic centimeters for chamber 36, for membrane surface areas of 1.0 meter for each of membranes 44 and 46, and for parallel or co-current flow as described herein, 8 hours has been found sufficient for transfer of sufficient waste products from a diseased human of approximately 150 pounds body weight to a normal human of like weight to lower the concentration of waste products in the diseased human to values approaching the normal human.

As explained above, membranes are available which can be utilized to maintain the molecular weight cut-off of 5,000 to 10,000 so that commingling of undesirable blood substances is prevented. For example such membranes as cellophane or cuprophane which are unilaterally stretched and/or acetylated according to the technique of Craig may be used. Thus, waste substances such as urea, creatinine, water and potassium having molecular weights of 60, 113, 18 and 39 will easily pass from the blood of the diseased human within chamber 24 through membrane 44, through the physiological solution within chamber 36, through membrane 46 and into the blood of the normal human within chamber 30 where they may be removed from the blood of the normal human 12 by normal excretory processes.

During this transfer, however, the 5,000 to 10,000 molecular weight cut-off of membranes 44 and 46 prevent the undesirable passage of macromolecular blood components ranging in molecular weight from 10,000 and upward. Transfer of such macromolecular blood substances is not considered safe due to possible ensuing immunological reactions.

If, however, a membrane failure occurs, such a failure would be sensed by membrane failure detector apparatus 50 and specifically by a decrease in the radioactivity sensed by Geiger counter 52 which continually samples the recirculating physiological fluid within chamber 36 by means of shunt tube 51. A decrease in radioactivity would be immediately sensed because a membrane leak would cause physiological fluid within third chamber 36 to flow from chamber 36, through the ruptured membrane, and into another chamber. Thus, a dilution of the radioisotope tracer would occur, which dilution would decrease the level of radioactivity in the physiological fluid within chamber 36, and the detector 50 would sound an alarm and enable an operator or an automatic process to terminate the dialysis with sufficient time to avoid any transfer of undesirable blood components from one human to the other.

The use of Insulin–I131, which has a molecular weight of approximately 5,700 is particularly advantageous with membranes having molecular weight cut-offs of 5,000 to 10,000 since the Insulin–I131 is considerably smaller than those blood components whose transfer from one organism to another upon membrane failure is undesirable. Thus, the probability of Insulin–I131 transmembrane diffusion is much greater than of any undesirable blood components. Further, in the case of a single or double membrane failure, sufficient time is available to terminate the treatment before commingling of undesirable blood components occurs because the recirculation time of the physiological fluid within the chamber 36 is much less than the waste product convection or transfer time across chamber 36. Thus, in practice several cycles of physiological fluid within chamber 36 are required before a molecule appearing in chamber 36 at one membrane face is transferred to the face of the other membrane in chamber 36. This convection time allows ample opportunity for the dilution of the Insulin–I131 concentration and the resultant decrease in radioactivity within the physiological fluid within chamber 36 which will cause the initiation of the alarm by means of membrane failure detector 50.

The maximum pore size of membranes 44 and 46 are therefore determined by each particular application of parabiotic dialysis apparatus 25. That is, the membrane pore size is determined by what substances are desired to be passed and what substances are desired to be held back. Maximum pore size is also limited in order to eliminate the possibility of transmembrane exchange of undesirable macromolecules which are not considered safe due to possible ensuing immunological reactions.

Once the membrane pore size is chosen, the radioactive tracer molecule may be chosen such that its physical size will not normally pass through the membrane (e.g., the tracer molecule only passes upon a membrane failure). Thus, the radioactive tracer molecule is chosen by size so that its molecular radius is greater than the pore size of either membrane 44 or 46, which pore size is governed by the intended application of parabiotic dialysis apparatus 25, and the tracer molecule is chosen such that it is capable of being detected.

What is claimed is:

1. Apparatus for blood to blood exchange of substances between a first organism and a second organism, comprising in combination:
   a. a first closed surface forming a first chamber designed to hold blood
   b. first conduit means fluidically communicating with the first chamber and arranged to attach to cannulation means associated with the first organism for supplying blood from the first organism to the first chamber;
   c. second conduit means fluidically communicating with the first chamber and arranged to attach to cannulation means associated with the first organism for returning blood from the first chamber to the first organism;
   d. a second closed surface forming a second chamber designed to hold blood;
   e. third conduit means fluidically communicating with the second chamber and arranged to attach to cannulation means associated with the second organism for supplying blood from the second organism to the second chamber;
   f. fourth conduit means fluidically communicating with the second chamber and arranged to attach to cannulation means associated with the second organism for returning blood from the second chamber to the second organism;
   g. a third chamber designed to hold physiological fluid, the third chamber comprising:
      aa. a first portion including a third closed surface designed to hold a physiological fluid; and
      bb. a second portion including a fourth closed surface designed to hold a physiological fluid; and
   h. first membrane means, forming at least a portion of the first surface, having a first face arranged to contact blood within the first chamber and having a second face arranged to contact physiological fluid within the first portion of the third chamber to form an interface between the first chamber and the third chamber:
   i. second membrane means, forming at least a portion of the second surface, having a first face arranged to contact blood within the second chamber and having a second face arranged to contact physiological fluid within the second portion of the third chamber to form an interface between the second chamber and the third chamber;
   j. fifth conduit means for fluidically interconnecting the portions of the third chamber to allow any physiological fluid within the third chamber to recycle, including:
      aa. a first portion fluidically communicating with the first portion of the third chamber for supplying fluid from the first portion and fluidically communicating with the second portion of the third chamber for returning fluid to the second portion;
      bb. a second portion fluidically communicating with the second portion of the third chamber for supplying fluid from the second portion and fluidically communicating with the first portion of the third chamber for returning fluid to the first portion;
   k. variable orifice means interconnected within one of the first and second portions of the fifth conduit means for allowing ultrafiltration between the first organism and the second organism;
   l. pump means connected to the other of the first and second portions of the fifth fluid conduit means, the pump means being designed to continually recycle the physiological fluid within the third chamber; and m. detector means positioned in relation to the third chamber so as to continually monitor the physiological fluid in the third chamber and provide an alarm indicating a membrane leak.

2. The apparatus of claim 1, wherein the portions of the third chamber each comprise one-half of the third chamber.

3. The apparatus of claim 2, wherein the fluid flow within the first conduit means and the second conduit means, fluid flow within the third conduit means and the fourth conduit means, and fluid flow within the fifth conduit means are co-current.

4. The apparatus of claim 3 wherein the volume of the third chamber is not substantially greater than 2,000 cubic centimeters.

5. The apparatus of claim 4, wherein the volumes of the first chamber and the second chamber are each not substantially greater than 500 cubic centimeters.

6. The apparatus of claim 5, wherein the first and second membrane means each have surface areas not substantially greater than 3 square meters.

7. The apparatus of claim 6, wherein the volume of the third chamber is not substantially greater than 1,000 cubic centimeters.

8. The apparatus of claim 7, wherein the volumes of the first chamber and the second chamber are each not substantially greater than 300 cubic centimeters.

9. The apparatus of claim 8, wherein the first and second membrane means each have surface areas not substantially greater than 1 square meter.

10. The apparatus of claim 9, wherein the maximum maintainable size of any individual pore of the first membrane means is such that the first membrane means is substantially impermeable at least to molecules of molecular weight greater than 10,000.

11. The apparatus of claim 10, wherein the maximum maintainable size of any individual pore of the second membrane means is such that the second membrane means is substantially impermeable at least to molecules of molecular weight greater than 10,000.

* * * * *